United States Patent [19]
Yoshioka

[11] Patent Number: 5,517,955
[45] Date of Patent: May 21, 1996

[54] VALVE TIMING CONTROL DEVICE FOR AN INTERNAL COMBUSTION ENGINE

[75] Inventor: Mamoru Yoshioka, Susono, Japan

[73] Assignee: Toyota Jidosha Kabushiki Kaisha, Toyota, Japan

[21] Appl. No.: 457,421

[22] Filed: Jun. 1, 1995

Related U.S. Application Data

[62] Division of Ser. No. 312,586, Sep. 27, 1994.

[30] Foreign Application Priority Data

Sep. 28, 1993 [JP] Japan ................... 5-241378

[51] Int. Cl.$^6$ ................... F01L 1/34
[52] U.S. Cl. ................... 123/90.15
[58] Field of Search ................... 123/90.15, 90.16, 123/90.17

[56] References Cited

U.S. PATENT DOCUMENTS

| | | | |
|---|---|---|---|
| 4,324,210 | 4/1982 | Aoyama | 123/90.16 |
| 5,031,582 | 7/1991 | Kruger | 123/90.15 |
| 5,074,260 | 12/1991 | Yagi et al. | 123/90.16 |
| 5,222,465 | 6/1993 | Sakamuto et al. | 123/90.15 |
| 5,233,831 | 8/1993 | Hitomi et al. | 123/90.15 |
| 5,293,741 | 3/1994 | Kashiyama et al. | 123/90.15 |
| 5,333,577 | 8/1994 | Shinojima | 123/90.15 |
| 5,398,502 | 3/1995 | Watanabe | 123/90.15 |

FOREIGN PATENT DOCUMENTS 4-194331 7/1992 Japan.

*Primary Examiner*—Weilun Lo
*Attorney, Agent, or Firm*—Kenyon & Kenyon

[57] ABSTRACT

A valve timing control device for an internal combustion engine. The device comprises first determination means for determining a first optimal value of the valve overlap period in the current engine operating condition, on the basis of the current engine speed and load, second determination means for determining a second optimal value of the valve overlap period in the current engine operating condition by reducing the first optimal value when the engine has not warmed up, and valve overlap period control means for controlling a valve overlap period using the first optimal value when the current degree of opening of the throttle valve is larger than a predetermined value, even if the engine has not warmed up. A back-flow of exhaust gas does not occur when the degree of the throttle valve is relatively large so that the valve overlap period at this time is made larger and a higher engine torque can be obtained to increase the trapping efficiency and the scavenging efficiency, even if the engine has not warmed up.

6 Claims, 10 Drawing Sheets

Fig.1
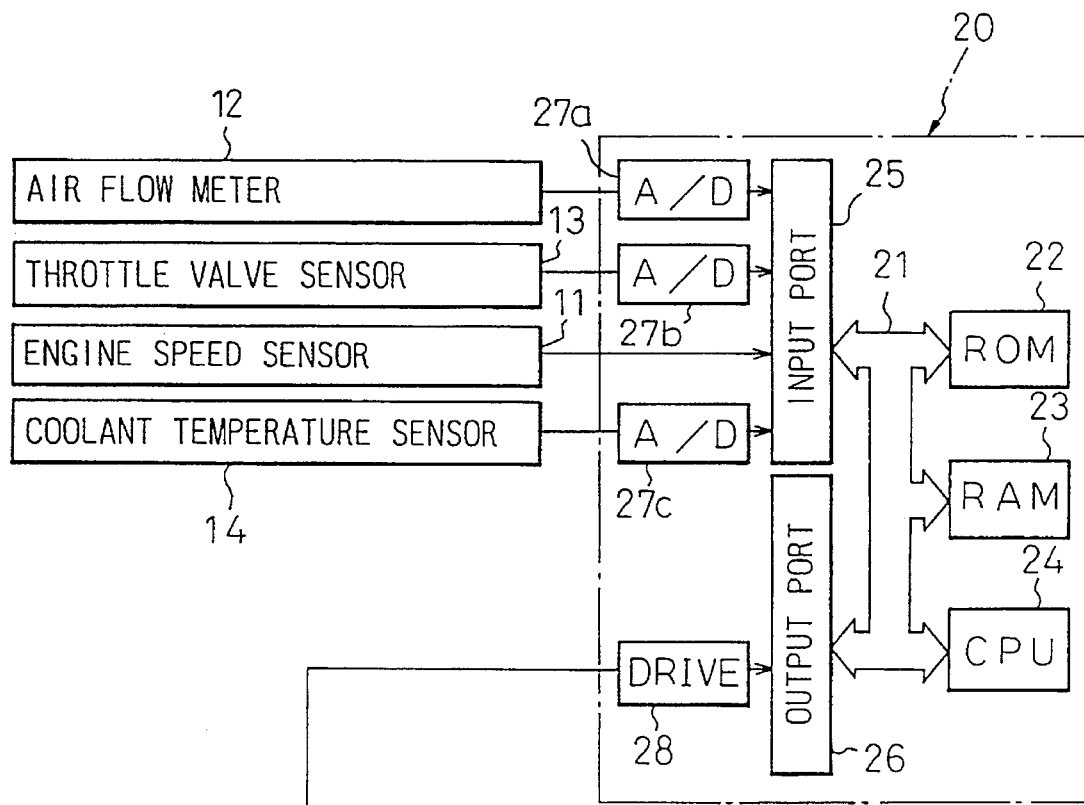
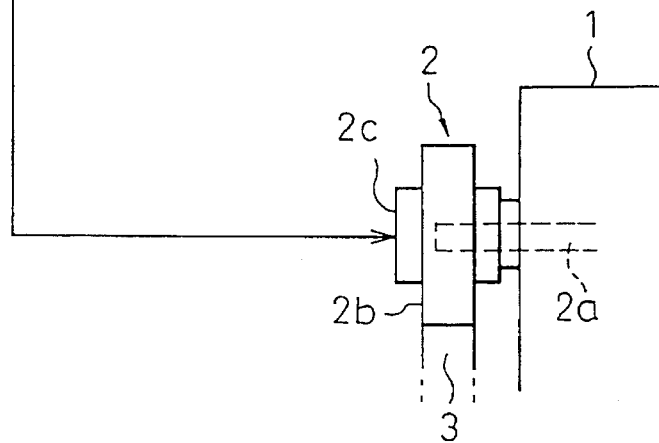

1

VALVE TIMING CONTROL DEVICE FOR AN INTERNAL COMBUSTION ENGINE

This application is a division of application Ser. No. 08/312,586, filed on Sep. 27, 1994.

BACKGROUND OF THE INVENTION

1. Field of the Invention

The present invention relates to a valve timing control device for an internal combustion engine, the device comprising a variable valve timing mechanism for controlling the valve overlap period.

2. Description of the Related Art

When the valve overlap period, during which the intake valve and the exhaust valve are opened simultaneously at the end of an exhaust stroke, is made long, the trapping efficiency and the scavenging efficiency increase so that a good performance at high engine speed can be obtained. On the other hand, in the idle condition, the long valve overlap period causes a back-flow of a large amount of exhaust gas so that combustion deteriorates. Accordingly, in an idle condition, it is desirable that the valve overlap period is made short. For this purpose, a variable valve timing mechanism capable of varying the valve overlap period has already been suggested.

A known valve timing control device for controlling the valve overlap period by means of the variable valve timing mechanism determines an optimal valve overlap period in accordance with a current engine operating condition on the basis of current engine load and engine speed. Moreover, Japanese Unexamined Patent Publication No. 4-194331 discloses a valve timing control device which makes the optimal valve overlap period determined for each engine operating condition shorter when the engine has not warmed-up because combustion at this time is unstable in contrast with when the engine is warmed-up.

According to the above valve timing control device, in each engine operating condition when the engine has not warmed up, the amount of back-flow exhaust gas is reduced so that combustion can become stable. However, in high engine load operating conditions, when the engine has not warm up, the required engine torque cannot be obtained.

SUMMARY OF THE INVENTION

Therefore, an object of the present invention is to provide a valve timing control device for an internal combustion engine, capable of realizing stable combustion in each engine operating condition and the required engine torque in high-engine-load operating conditions when the engine has not warmed up.

According to the present invention there is provided a valve timing control device comprising: first determination means for determining a first optimal value of the valve overlap period in the current engine operating condition, on the basis of the current engine speed and load; second determination means for determining a second optimal value of the valve overlap period in the current engine operating condition by reducing the first optimal value when the engine has not warmed up; and valve overlap period control means for controlling a valve overlap period using the first optimal value when the current degree of opening of the throttle valve is larger than a predetermined value, even if the engine has not warmed up.

The present invention will be more fully understood from the description of the preferred embodiments of the invention set forth below, together with the accompanying drawings.

BRIEF DESCRIPTION OF THE DRAWINGS

In the drawings:

FIG. 1 is a schematic view of a valve timing control device, according to the present invention;

DESCRIPTION OF THE PREFERRED EMBODIMENTS

Figure 2:
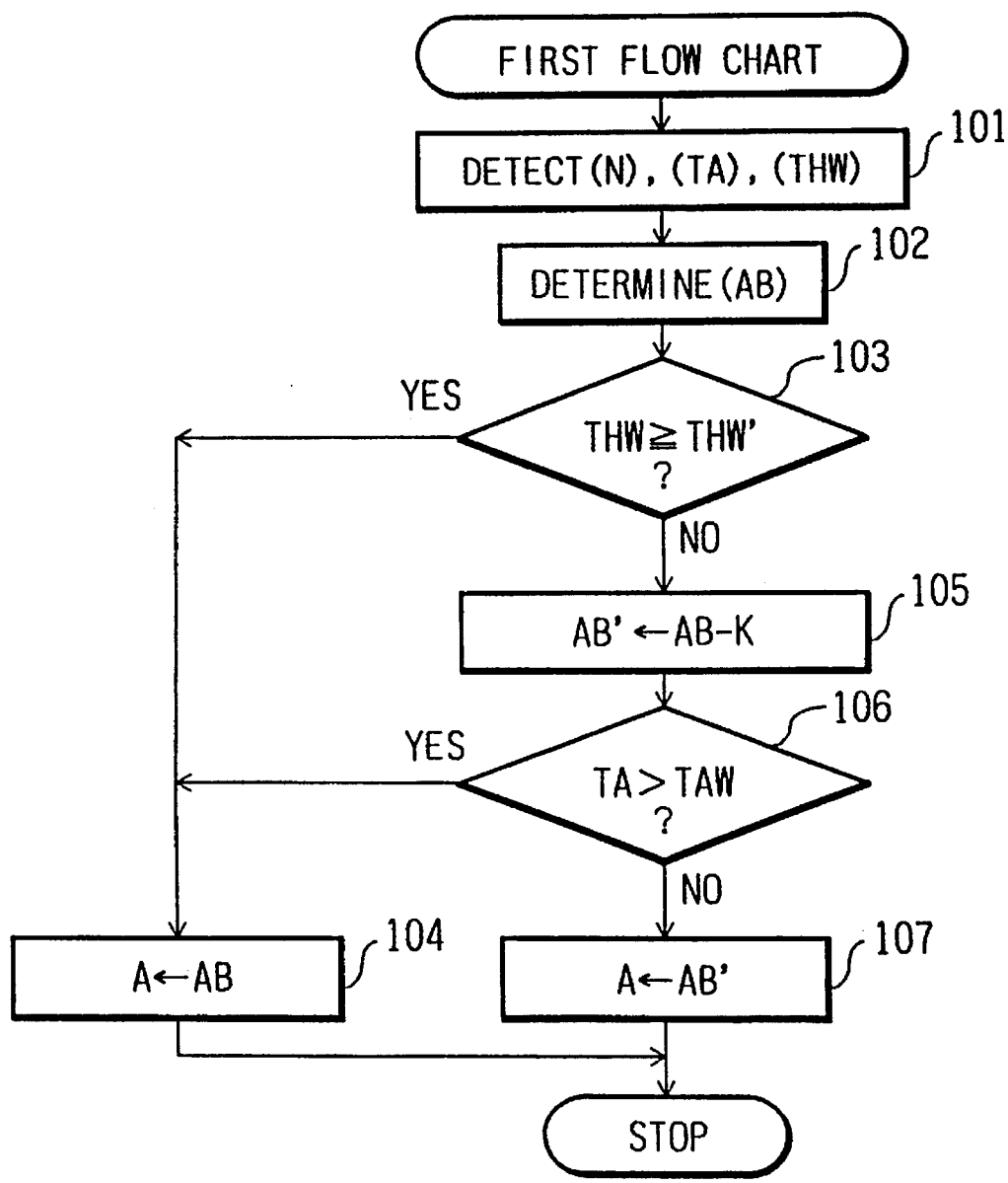
FIG. 2 is a first flow chart for controlling the valve overlap period via a variable valve timing mechanism by an electronic control unit.

FIG. 1 is a schematic view of a valve timing control device, according to the present invention. In this figure, reference numeral 1 designates a cylinder head of an engine and reference numeral 2 designates a variable valve timing mechanism. Various types of the variable valve timing mechanism have already been suggested. Here, one of them is simply explained as follows. Reference numeral 2a designates a cam shaft for the intake valve and reference numeral 2b designates a pulley which is rotated by a crank shaft (not shown) via a belt 3. The pulley 2 is fixed to an outer sleeve 2c which surrounds the end of the cam shaft 2a. Outer teeth (not shown) are formed around the end of the cam shaft 2a and inner teeth (not shown) are formed around inside wall of the outer sleeve 2c. Moreover, an intermediate gear (not shown) which has outer and inner teeth is arranged between the outer sleeve 2c and the end of the cam shaft 2a. The outer teeth of the cam shaft 2a and the inner teeth of the outer sleeve 2c mesh the inner and outer teeth of the intermediate gear, respectively. The inner teeth of the outer sleeve 2c and the outer teeth of the intermediate gear are formed as helical teeth so that when the intermediate gear is moved axially by oil pressure and the like, the cam shaft 2a is relatively rotated against the outer sleeve 2c. Thus, the variable valve timing mechanism 2 can vary the valve overlap period freely by changing the opening time of the intake valve in accordance with this relative rotation of the cam shaft 2a.

Reference numeral 20 designates an electronic control unit (ECU) for controlling the valve overlap period via the variable valve timing mechanism 2. The ECU 20 is constructed as a digital computer and includes a ROM (read only memory) 22, a RAM (random access memory) 23, a CPU (microprocessor, etc.) 24, an input port 25, and an output port 26. The ROM 22, the RAM 23, the CPU 24, the input port 25, and the output port 26 are interconnected by a bidirectional bus 21.

An engine speed sensor 11 which produces an output pulse for detecting the engine speed is connected to the input port 25. In addition, an air flow meter 12 produces an output voltage which is proportional to the amount of intake air fed into the engine cylinder, and this output voltage is input into the input port 25 via an AD converter 27a. A throttle valve sensor 13 produces an output voltage which is proportional to the degree of opening of the throttle valve (not shown), and this output voltage is input into the input port 25 via an AD converter 27b. A coolant temperature sensor 14 produces an output voltage which is proportional to the temperature of the cooling water of the engine as the engine temperature, and this output voltage is input into the input port 25 via an AD converter 27c. The output port 26 is connected to the variable valve timing mechanism 2 via a drive circuit 28.

Figure 3:
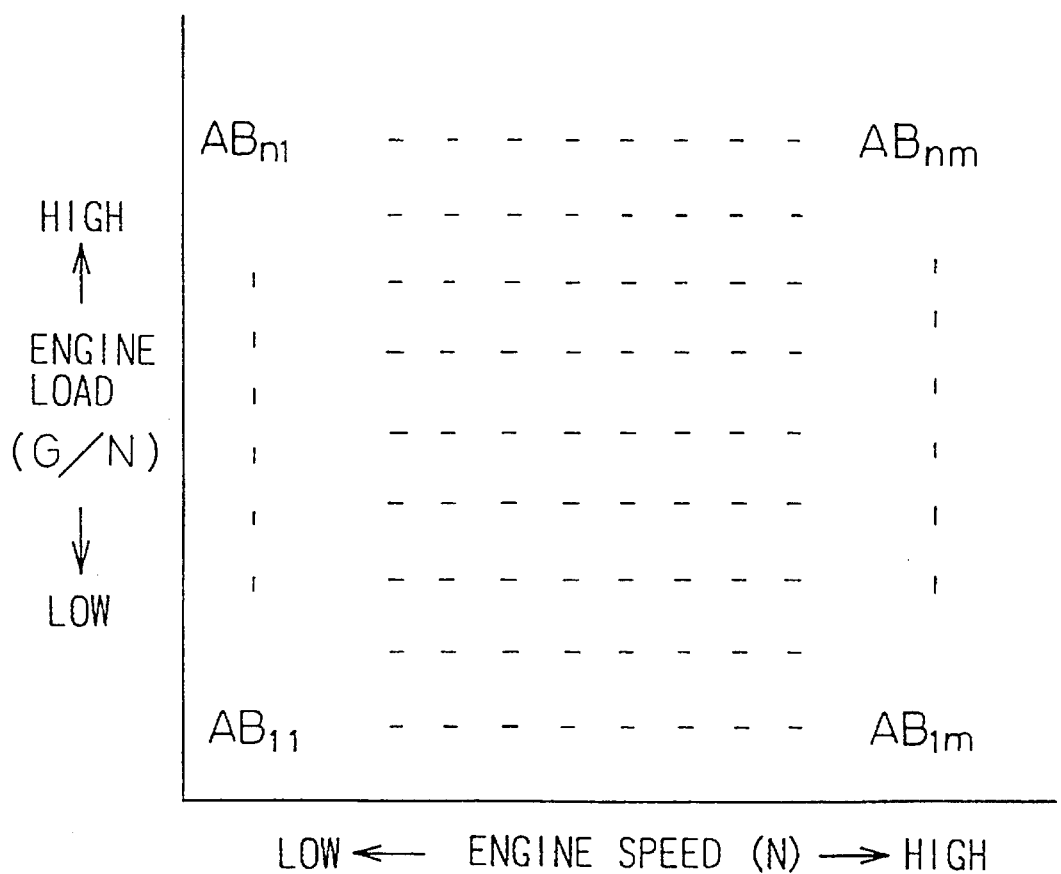
FIG. 3 is a first map for determining an optimal value of the valve overlap period in accordance with an engine operating condition.

The ECU 20 controls the valve overlap period via the variable valve timing mechanism 2, according to a first flow chart shown in FIG. 2. First, at step 101, the current engine speed (N), the current amount of intake air fed into the engine cylinder (G), the current degree of opening of the throttle valve (TA), and the current temperature of the cooling water (THW) are detected by the above four sensors 11, 12, 13, 14, respectively. Next, at step 102, a basic optimal value (AB) of the valve overlap period in the current engine operating condition is determined from a first map, shown in FIG. 3, on the basis of the current engine load (G/N) (an amount of intake air fed into the engine cylinder per unit engine speed) and the current engine speed (N). In the first map, a basic optimal value (ABnm) for each engine operating condition is set, such that the smaller the engine load (G/N) becomes, the smaller the basic optimal value (ABnm) becomes to realize stable combustion, because the negative pressure in an intake port at a low engine load is relative high so that if the valve overlap period is made long, the amount of back-flow exhaust gas becomes large, and the larger the engine load (G/N) becomes, the larger the basic optimal value (ABnm) becomes to increase the trapping efficiency and the scavenging efficiency to take account of the current engine speed (N).

Next, the routine goes to step 103, it is determined if the current temperature (THW) of the cooling water of the engine is equal to or higher than a predetermined lower limit value (THW') which represents the engine warmed-up temperature. When the result is positive, the routine goes to step 104 and a valve overlap period (A) at this time is set to the basic optimal value (AB) determined at step 102. Next, the routine is stopped.

On the other hand, when the result at step 103 is negative, the routine goes to step 105 and an optimal value (AB') when the engine has not warmed up and is in a cold condition is calculated by subtracting a correction value (K) from the basic optimal value (AB). Next, at step 106, it is determined if the current degree of opening of the throttle valve (TA) is larger than a predetermined value (TAW). When the result is negative, i.e., when the degree of opening of the throttle valve (TA) is not very large, the routine goes to step 107 and a valve overlap period (A) at this time is set to the optimal value (AB') for the cold condition. Next, the routine is stopped. Thus, when the degree of opening of the throttle valve (TA) is not very large in the cold condition, the valve overlap period (A) at this time is made smaller than the basic optimal value (AB) so that the amount of back-flow exhaust gas is further reduced and in each engine operating condition, deterioration of combustion in the cold condition is prevented.

On the other hand, when the result at step 106 is positive, i.e., when the degree of opening of the throttle valve (TA) is very large, the routine goes to step 104. Thus, when the degree of opening of the throttle valve (TA) is very large, pressure in the intake port is about atmospheric pressure so that back-flow of exhaust gas does not occur in spite of the large valve overlap period. Whereby, if the valve overlap period at this time is made smaller than the basic optimal value (AB), the combustion cannot be improved and the trapping efficiency and the scavenging efficiency are reduced. Accordingly, at step 104, the valve overlap period (A) is made the basic optimal value (AB) so that the trapping efficiency and the scavenging efficiency increase and a higher engine torque can be obtained.

Figure 4:
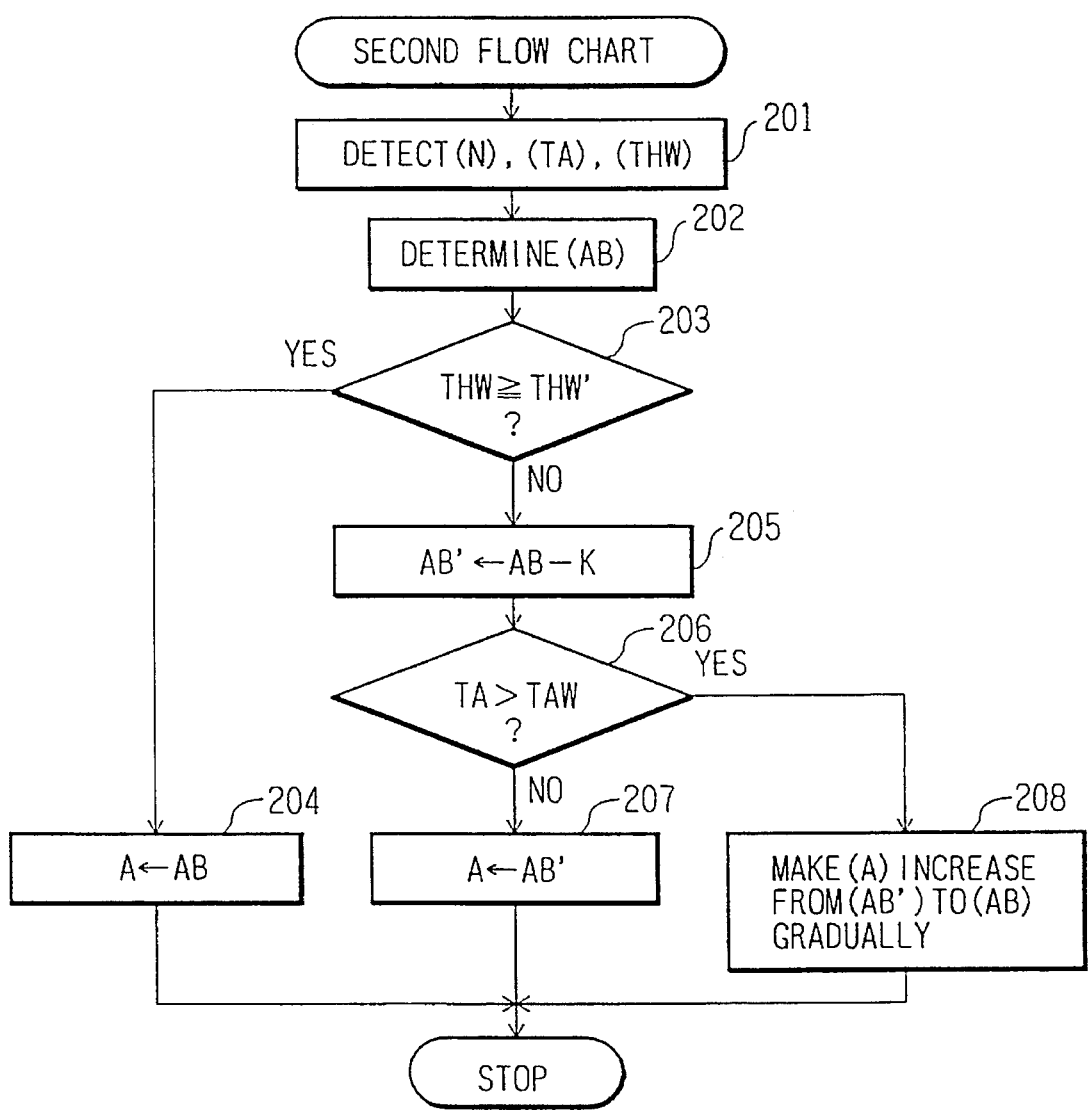
FIG. 4 is a second flow chart for controlling the valve overlap period via a variable valve timing mechanism by an electronic control unit.

The ECU 20 may control the valve overlap period according to a second flow chart shown in FIG. 4, instead of the first flow chart. The difference between the first and second flow charts is explained as follows.

Figure 5:
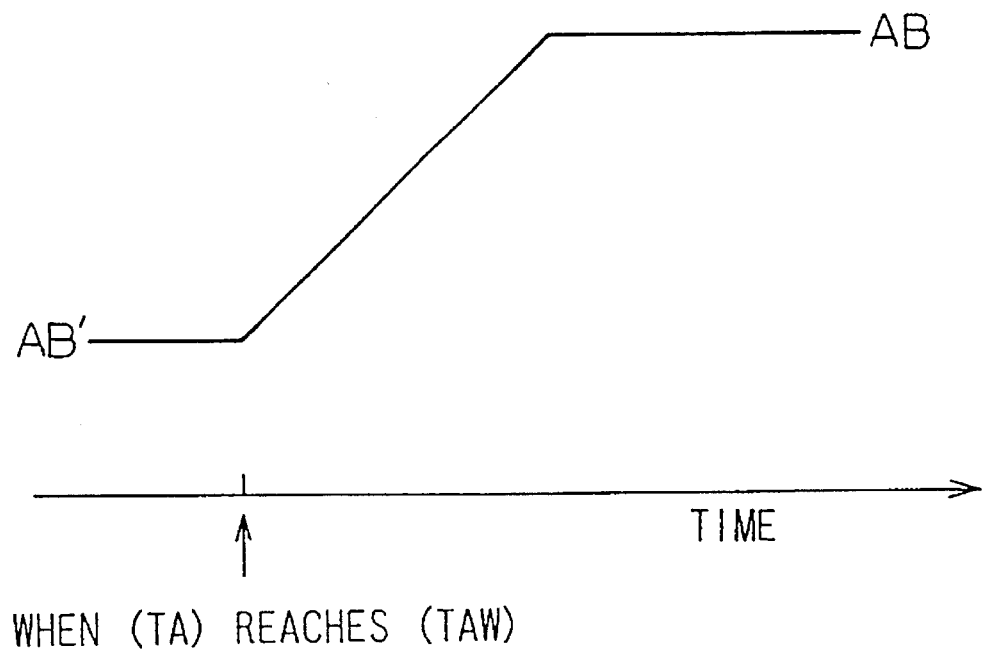
FIG. 5 is a time chart of the valve overlap period controlled by the second flow chart.

In the second flow chart, when the engine has not warmed up, it is determined at step 206 if the current degree of opening of the throttle valve (TA) is larger than the predetermined value (TAW). When the result is positive, the routine goes to step 208 and the valve overlap period (A) is gradually varied from the optimal value (AB') in the cold condition calculated at step 205, to the basic optimal value (AB) determined at step 202, as shown in FIG. 5.

According to the second flow chart, when the degree (TA) of opening of the throttle valve exceeds the predetermined value (TAW) in the cold condition, the valve overlap period is at first set to the optimal value (AB') in the cold condition so that the difference between the valve overlap periods at this time and at the last time is relatively small and the large engine torque variation is not generated. Thereafter, the valve overlap period is gradually increased to the basic optimal value (AB) so that the engine torque can be increased without the large torque variation.

Figure 6:
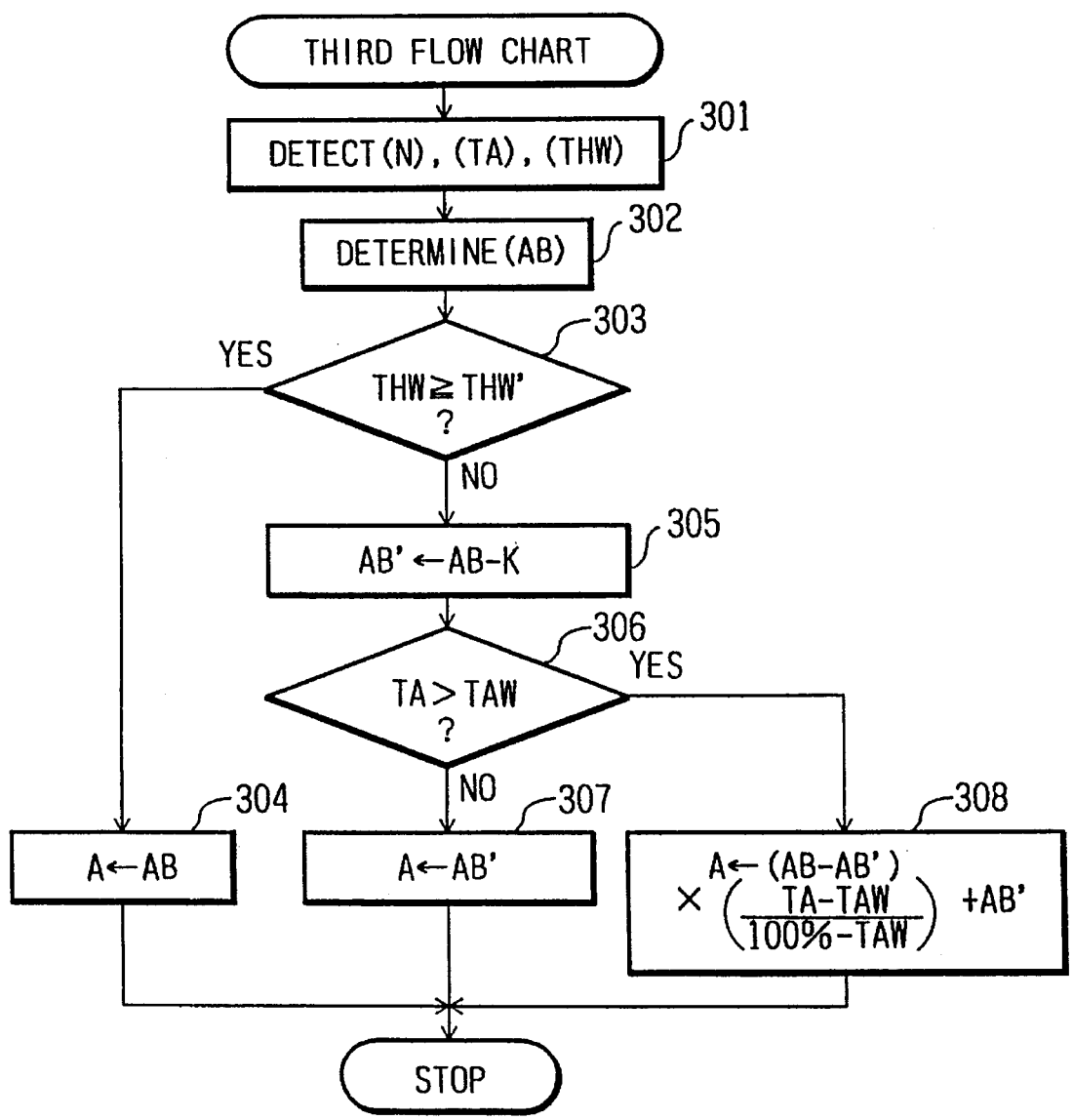
FIG. 6 is a third flow chart for controlling the valve overlap period via a variable valve timing mechanism by an electronic control unit.

The ECU 20 may control the valve overlap period according to a third flow chart shown in FIG. 6, instead of the second flow chart. The difference between the second and third flow charts is explained as follows.

In the third flow chart, when the engine has not warmed up, it is determined at step 306 if the current degree (TA) of opening of the throttle valve is larger than the predetermined value (TAW). Thereafter, when the result is positive, the routine goes to step 308 and the valve overlap period (A) is calculated using the following expression (1).

$$A=(AB-AB')*(TA-TAW)/(100\%-TAW)+AB' \qquad (1)$$

Figure 7:
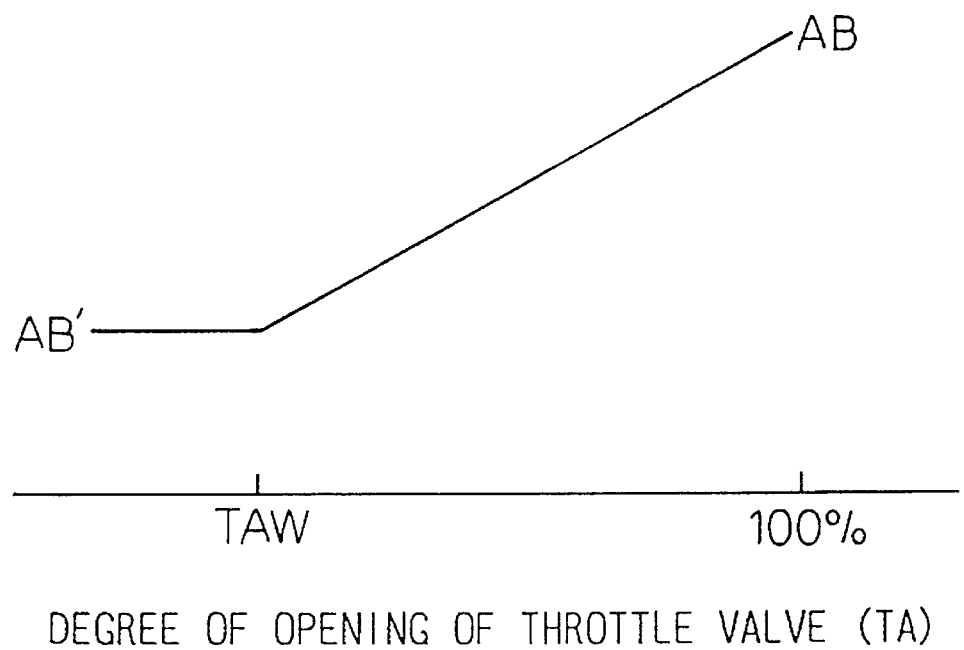
FIG. 7 is a time chart of the valve overlap period controlled by the third flow chart.

According to the expression (1), as shown in FIG. 7, when the degree (TA) of opening of the throttle valve reaches the predetermined value (TAW), the valve overlap period (A) is made the optimal value (AB') in the cold condition. Moreover, when the degree (TA) of opening of the throttle valve reaches the full open value (100%), the valve overlap period (A) is made the basic optimal value (AB), and when the degree (TA) of opening of the throttle valve is a value between the predetermined value (TAW) and the full open value (100%), the valve overlap period (A) is made a value in accordance with the current degree (TA) of opening of the throttle valve.

According to the third flow chart, when the degree (TA) of opening of the throttle valve exceeds the predetermined value (TAW) in the cold condition, the large torque variation is not generated as in the second flow chart. Moreover, the engine torque can be increased as the driver desires because the valve overlap period is increased in accordance with the degree of opening of the throttle valve.

Figure 8:
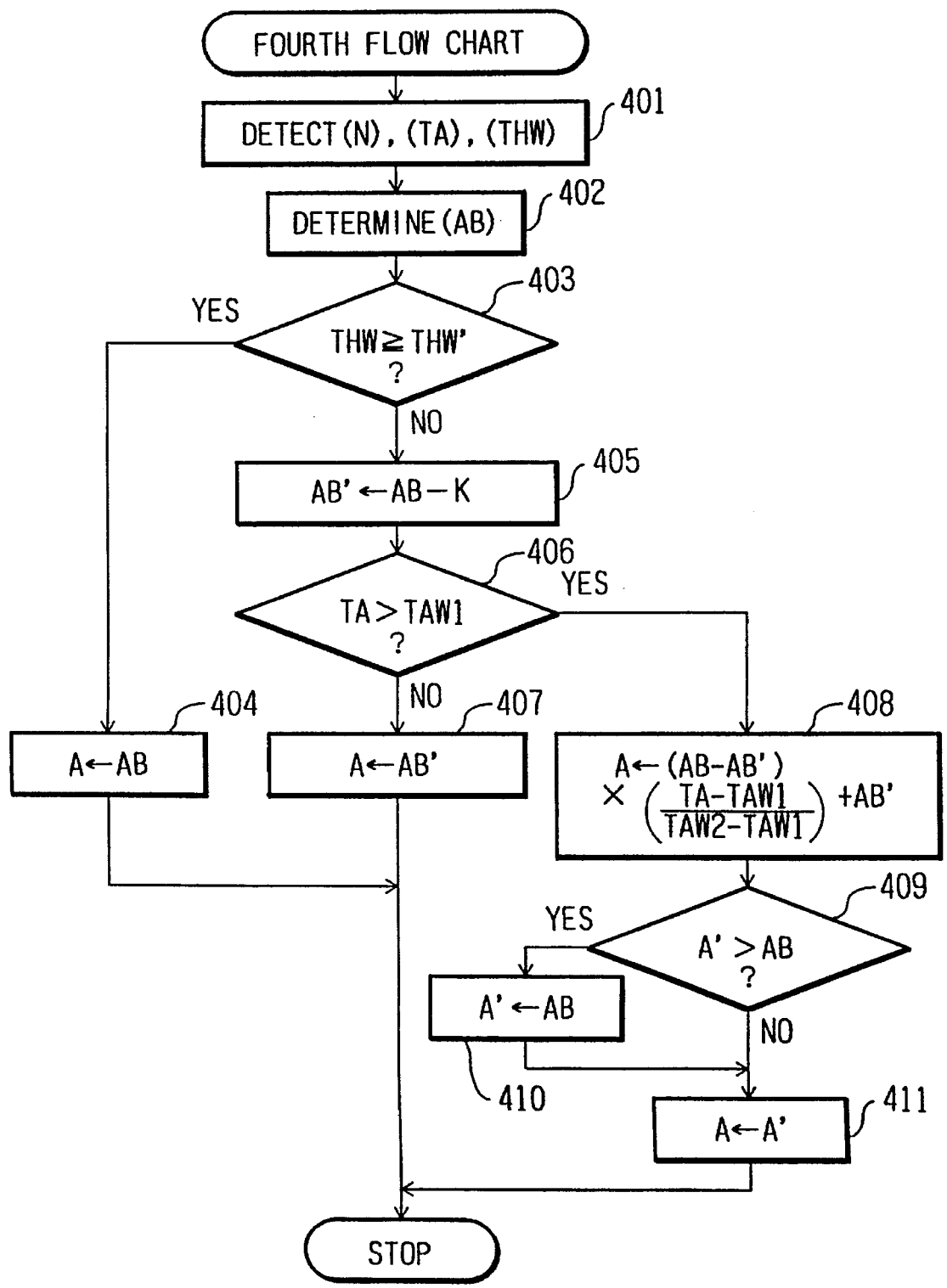
FIG. 8 is a fourth flow chart for controlling the valve overlap period via a variable valve timing mechanism by an electronic control unit.

The ECU 20 may control the valve overlap period according to a fourth flow chart shown in FIG. 8, instead of the third flow chart. The difference between the third and fourth flow charts is explained as follows.

In the fourth flow chart, when the engine has not warmed up, at step 406 it is determined if the current degree (TA) of opening of the throttle valve is larger than a first value (TAW1). Here, the first value (TAW1) is not a constant as the predetermined value (TAW) in the previous flow charts, and is a variable which vary in accordance with a current engine speed (N). The first value (TAW1) is set in a second map shown in FIG. 9, such that the lower the engine speed becomes, the smaller the first value (TAW1) becomes. When the result at step 406 is positive, the routine goes to step 408 and a calculation value (A') of the valve overlap period is calculated using the following expression (2).

$$A' = (AB - AB') * (TA - TAW1)/(TAW2 - TAW1) + AB' \quad (2)$$

Next, the routine goes to step 409 and it is determined if the calculation value (A') is larger than the basic optimal value (AB). Only when the result is positive, does the routine go to step 410 and the calculation value (A') is set to the basic optimal value (AB). Next, the routine goes to step 411 and the valve overlap period (A) is set to the calculation value (A').

Figure 9:
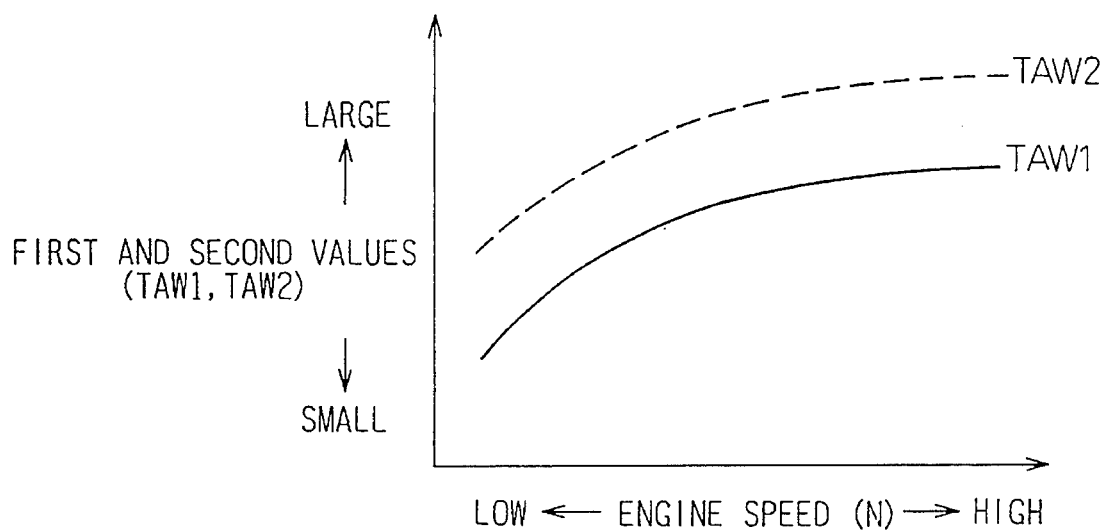
FIG. 9 is a second map for determining a first value and a second value in accordance with an engine speed.

The expression (2) uses the first value (TAW1) instead of the predetermined value (TAW) and a second value (TAW2) instead of (100%), in contrast to the expression (1). Here, the second value (TAW2) is a variable which vary in accordance with a current engine speed (N) as same as the first value (TAW1), and is always larger than the first value (TAW1) as shown in the second map (FIG. 9).

As seen from the expression (2), when the degree (TA) of opening of the throttle valve reaches to the first value (TAW1), the calculation value (A') of the valve overlap period becomes the optimal value (AB') in the cold condition. Moreover, when the degree (TA) of opening of the throttle valve reaches to the second value (TAW2) prior to the full open value (100%), the calculation value (A') becomes the basic optimal value (AB), and when the degree (TA) of opening of the throttle valve is a value between the first value (TAW1) and the second value (TAW2), the calculation value (A') becomes a value in accordance with the current degree (TA) of opening of the throttle valve. In the expression (2), when the degree (TA) of opening of the throttle valve is larger than the second value (TAW2), the calculation value (A') becomes larger than the basic optimal value (AB) but the calculation value (A') is set to the basic optimal value (AB) at step 410.

According to the fourth flow chart, in the cold condition, when the engine speed is relatively low, the valve overlap period (A) is brought from the optimal value (AB') in the cold condition close to the basic optimal value (AB) even if the degree (TA) of opening of the throttle valve is smaller than in the third flow chart. Since a required amount of intake air at a low engine speed is smaller than at a high engine speed, even if the valve overlap period at low engine speed is made larger, the amount of back-flow exhaust gas is slightly increased, and the trapping efficiency and the scavenging efficiency are sufficiently increased, and thus the engine torque at this time can be increased.

Figure 10:
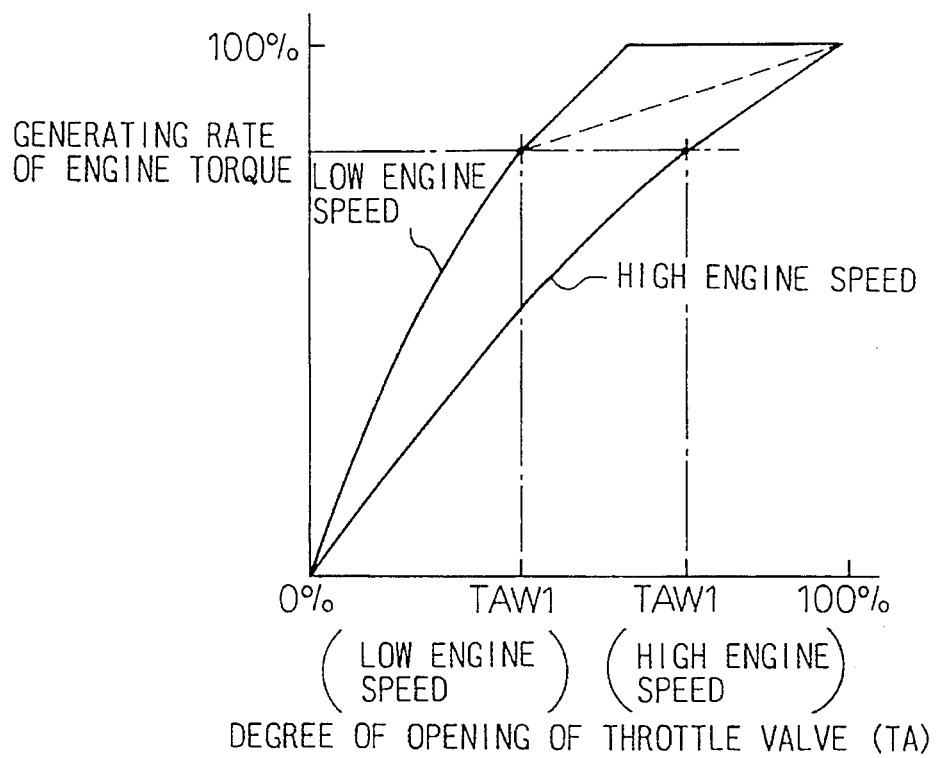
FIG. 10 is a graph showing the generating rate of the engine torque against the degree of opening of the throttle valve.

Moreover, in the cold condition, when the engine speed is relative low, the valve overlap period (A) reaches the basic optimal value (AB) even if the degree (TA) of opening of the throttle valve is smaller than (100%). Accordingly, as seen from a graph shown in FIG. 10, in each engine speed operating condition, the relationship between the degree of opening of the throttle valve (TA) and the generating rate of the engine torque (in each engine operating condition, the ratio of the actual generating torque to the maximum generating torque does not to take account of a deterioration in combustion) becomes linear. In the third flow chart, when the valve overlap period is brought from the optimal value (AB') close to the basic optimal value (AB) at a low engine speed, the increasing rate of the engine torque against the degree of opening of the throttle valve is relatively small, as shown by the dot line of the graph. However, according to the fourth flow chart, the engine torque in each engine speed operating condition is sufficiently increased, and thus, the vehicle moves as the driver desires.

Figure 11:
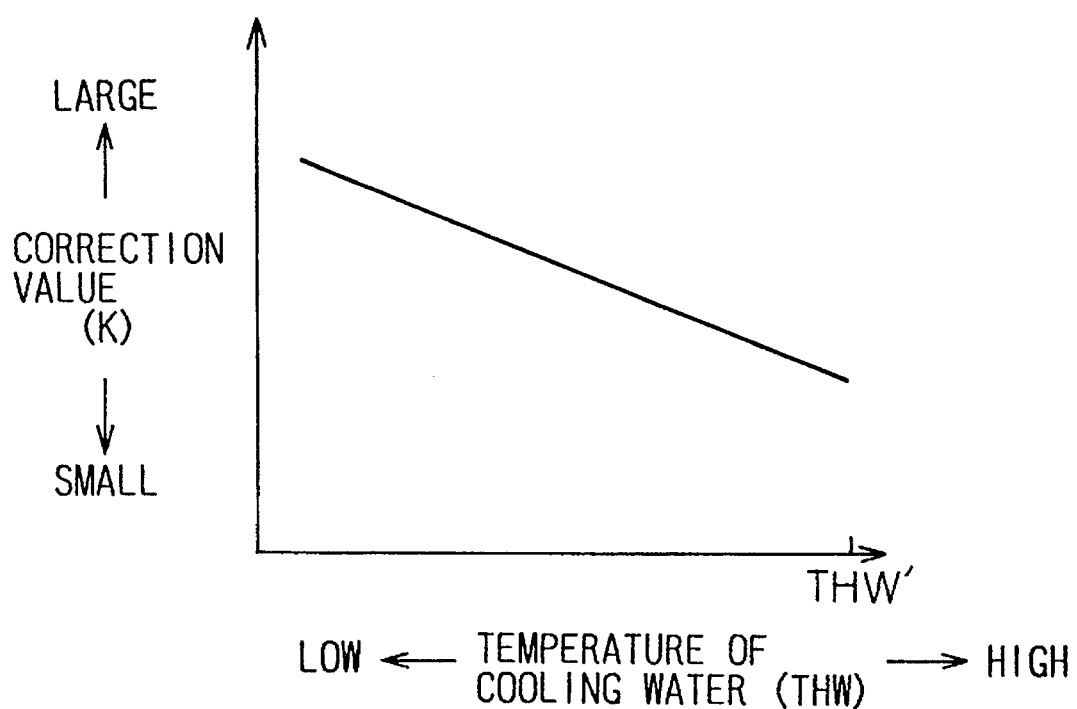
FIG. 11 is a third map for determining a correction value in accordance with the temperature of the cooling water.

In the previous embodiments, the correction value (K) is a constant to simplify the control for the valve overlap period. However, it may be a variable as shown in a third map (FIG. 11) so that the valve overlap period can be controlled more favorably to take account of the engine temperature.

Finally, the variable valve timing mechanism 2 can vary the valve overlap period smoothly. However, it is clear that the present invention can be realized by a variable valve timing mechanism which varies the valve overlap period in stages.

Although the invention has been described with reference to specific embodiments thereof, it should be apparent that numerous modifications can be made thereto by those skilled in the art, without departing from the basic concept and scope of the invention.

I claim:

1. A valve timing control device for an internal combustion engine comprising:

first determination means for determining a first optimal value of a valve overlap period in a current engine operating condition, on the basis of a current engine speed and load;

second determination means for determining a second optimal value of the valve overlap period in the current engine operating condition by reducing said first optimal value when the engine has not warmed up; and valve overlap period control means for controlling a valve overlap period using said first optimal value when a current degree of opening of a throttle valve is larger than a predetermined value, even if the engine has not warmed up.

2. A valve timing control device according to claim 1, wherein said second determination means determines said second optimal value by subtracting a constant correction value from said first optimal value.

3. A valve timing control device according to claim 1, wherein said second determination means determines said second optimal value by subtracting a variable correction value from said first optimal value, said variable correction value being set such that the higher the engine temperature becomes, the smaller said variable correction value becomes.

4. A valve timing control device for an internal combustion engine comprising:

first determination means for determining a first optimal value of a valve overlap period in a current engine operating condition, on the basis of a current engine speed and load;

second determination means for determining a second optimal value of the valve overlap period in the current engine operating condition by reducing said first optimal value when the engine has not warmed up; and valve overlap period control means for controlling a valve overlap period such that when a current degree of opening of a throttle valve is larger than a first value which is set at each engine speed, said valve overlap period is brought from said second optimal value close to said first optimal value in accordance with a ratio of said current degree of opening of the throttle valve to a second value which is set at each engine speed and is larger than said first value, even if the engine has not warmed up.

5. A valve timing control device according to claim 4, wherein said valve overlap period control means controls a valve overlap period according to the following expression when the current degree of opening of the throttle valve is larger than said first value, even if the engine has not warmed up:

$$A=(AB-AB')*(TA-TAW1)/(TAW2-TAW1)+AB'$$

where, (A) represents a valve overlap period, (AB) represents said first optimal value, (AB') represents said second optimal value, (TA) represents said degree of opening of the throttle valve, (TAW1) represents said first value, and (TAW2) represents said second value.

6. A valve timing control device according to claim 4, wherein the higher the engine speed becomes, the larger said first and second values become.

* * * * *